Patented Mar. 22, 1932

1,850,482

UNITED STATES PATENT OFFICE

FRITZ ULLMANN, OF GENEVA, SWITZERLAND, ASSIGNOR TO GENERAL ANILINE WORKS INC., OF NEW YORK, N. Y., A CORPORATION OF DELAWARE

PRODUCTION OF NEW VAT DYESTUFFS OF THE ANTHRAQUINONE ACRIDONE SERIES AND THE PRODUCTS

No Drawing. Application filed May 22, 1929, Serial No. 365,225, and in Germany May 31, 1926.

The present invention relates to the production of new vat dyestuffs by condensation of a chlorinated anthraquinone-1.2-acridone with aromatic acid amides, furthermore it relates to the production of Bz-dichloro-4-aminoanthraquinone-1.2-acridone from the said new arylamide compounds.

I have found that vat dyestuffs corresponding to the general formula:—

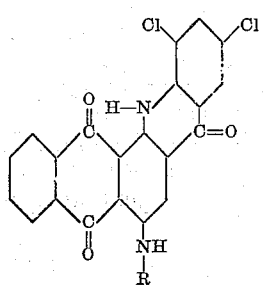

in which R stands for hydrogen or an aromatic acyl radicle which term is meant to comprise radicles of the type R'—CO— and R'—SO$_2$— in which R' is an aromatic radicle which may be further substituted, are obtained by condensing the Bz-dichloro-4-chloroanthraquinone-1.2-acridone of the formula:

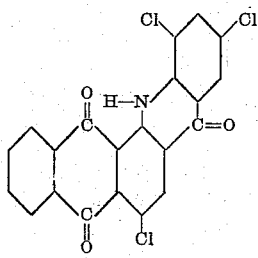

with aromatic acid amides viz. aromatic carboxylic acid amides or aromatic sulphonic acid amides, and saponifying the condensation products, if desired. The vat dyestuffs of the above given general formula in which R represents an aromatic acyl radicle are new compounds. The said Bz-dichloro-4-chloroanthraquinone-1.2-acridone is obtainable by chlorinating anthraquinone-1.2-acridone suspended in nitrobenzene by means of sulphuryl-chloride with the aid of chloroiodine as halogenating catalyst as described in Example 4 of the German Patent No. 258,561. By the said condensation only the chlorine atom in the 4-position of the anthraquinone nucleus is substituted by the said acid amide radicles, whereas the two chlorine atoms in the benzene nucleus do not react with the acid amides. The condensation is preferably carried out in a diluting or suspending medium and in the presence of acid-fixing agents sodium acetate, also condensing catalysts, such as for example copper or copper compounds, may be added to the reaction mixture, if desired.

It may sometimes be advisable when producing vat dyestuffs according to the present invention to condense the amino compound obtained by saponification of the condensation product of Bz-dichloro-4-chloroanthraquinone-1.2-acridone with an aromatic sulphonic acid amide, with a chloride of an aromatic carboxylic acid instead of condensing directly an aromatic carboxylic acid amide with Bz-dichloro-4-chloroanthraquinone-1.2-acridone. This manner of working is advantageously employed in all cases in which the aromatic carboxylic acid amide gives rise to secondary reactions, as for example in case of the employment of the amide of 1-chloroanthraquinone-2-carboxylic acid.

The condensation products exhibit a good affinity to the fibre and dye cotton violet to blue shades of very good fastness. Likewise the saponification product dyes cotton greenish blue shades exhibiting excellent fastness properties.

The following examples will further illustrate how the invention is carried into practical effect, but the invention is not limited thereto.

*Example 1*

4 parts of Bz-dichloro-4-chloroanthraquinone-1.2-acridone are heated to boiling while stirring with 1.8 parts of p-toluenesulphamide, 0.6 part of anhydrous sodium acetate, 0.05 part of copper acetate and 20 parts of nitrobenzene. The initial material dissolves, the coloration of the reaction mixture rapidly turns violet and acetic acid distills off. When the intensity of the coloration does not any more increase, which is the case after only a short heating period, the reaction mixture is allowed to cool whereby it solidifies to a crystal pulp. The pulp is diluted with ethyl alcohol, filtered by suction, the filter cake washed with ethyl alcohol and the violet residue boiled up with water and a small amount of dilute hydrochloric acid. The new vat dyestuff thus obtained forms handsome violet needles with a lustre of copper after recrystallization from dichlorobenzene in which it is readily soluble at the boiling point giving a violet solution. The dyestuff is insoluble in alcohol and ether but readily soluble in boiling nitrobenzene. It dissolves in concentrated sulphuric acid giving a brown red solution turning to orange red on short heating. With an alkaline hydrosulphite solution it gives a claret red vat from which cotton is dyed equal shades turning to violet on exposure to the air and washing.

In order to saponify the product it is introduced in about 10 parts of concentrated sulphuric acid and the solution warmed to about 80° C. On pouring the solution into water the Bz-dichloro-4-aminoanthraquinone-1.2-acridone separates in the form of green blue flakes and can directly be employed for dyeing after filtration and washing it free from sulphuric acid. The dyestuff gives a violet vat from which cotton is dyed violet shades turning blue with a strong greenish tinge on exposure to the air.

*Example 2*

If the condensation described in Example 1 be carried out with an equal amount of benzamide Bz-dichloro-4-benzoylamino-anthraquinone-1.2-acridone is obtained a blue violet dyestuff which may be purified by recrystallization from dichlorobenzene or nitrobenzene. It forms beautiful, dark, violet lustrous needles, soluble in nitrobenzene giving a blue solution and being difficultly soluble in dichlorobenzene. It dissolves in concentrated sulphuric acid giving a brown red solution from which blue violet flakes separate on the addition of water. Cotton is dyed by the said dyestuff from a violet vat blue violet extremely fast shades.

In order to produce Bz-dichloro-4-aminoanthraquinone-1.2-acridone from the aforesaid dyestuff the latter is dissolved in 10 parts of concentrated sulphuric acid and the solution is warmed to about 90° C. until the saponification is complete. The reaction product is then worked up as described in the second paragraph of Example 1 and is identical with the dyestuff described therein.

*Example 3*

5 parts of the Bz-dichloro-4-aminoanthraquinone-1.2-acridone obtainable according to the foregoing examples are mixed with 100 parts of nitrobenzene and the mixture heated to boiling to remove traces of water. After cooling to about 150° C. 5 parts of chloroanthraquinone-2-carboxylic acid chloride are added to the mixture which is then heated to boiling while stirring. The initially blue reaction mixture soon turns claret red under strong evolution of hydrogen chloride. After the reaction is complete the reaction mixture is diluted with benzene, the reaction product filtered off and washed with benzene. The pure new dyestuff is obtained in the form of violet red needles exhibiting a strong lustre of copper of an extremely low solubility in organic solvents, but giving a brown red solution with concentrated sulphuric acid from which violet flakes separate on the addition of water. The new dyestuff dyes cotton from a claret red vat bordeaux red shades turning violet on exposure to the air.

What I claim is:—

1. As new articles of manufacture vat dyestuffs of the anthraquinone acridone series corresponding to the general formula:

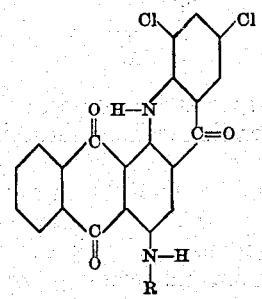

in which R stands for a radicle of the type R'—CO— and R'—SO$_2$— in which R' is a radicle selected from the group consisting of benzene and anthraquinone radicles which may be substituted by an alkyl group or halogen.

2. The process of producing Bz-dichloro-4-aminoanthraquinone-1.2-acridone which comprises condensing Bz-dichloro-4-chloroanthraquinone-1.2-acridone with an acid amide of a compound selected from the group consisting of benzene and anthraquinone which may be substituted by an alkyl group or halogen and saponifying the condensation product.

3. The process of producing Bz-dichloro- 4-aminoanthraquinone-1.2-acridone which comprises condensing Bz-dichloro-4-chloroanthraquinone-1.2-acridone with p-toluenesulphamide in an organic suspending medium in the presence of sodium acetate and copper acetate and saponifying the condensation product by warming it in concentrated sulphuric acid.

4. As a new article of manufacture the vat dyestuff of the formula:

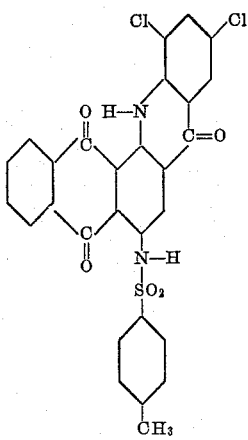

said dyestuff being soluble in boiling dichlorobenzene and boiling nitrobenzene with a violet coloration, insoluble in alcohol and ether, dissolving in concentrated sulfuric acid with a brown-red coloration which turns to orange-red on short heating, and dyeing cotton from a claret red vat equal shades turning to violet on exposure to the air and washing.

5. As a new article of manufacture the vat dyestuff of the formula:

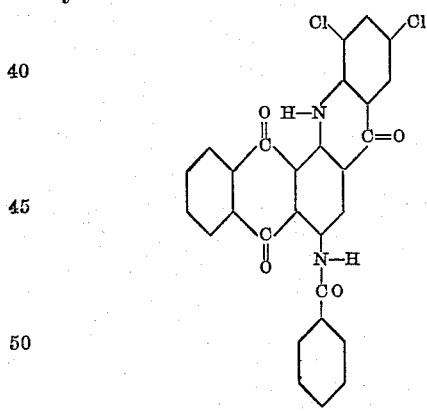

said dyestuff being soluble in nitrobenzene with a blue coloration and difficultly soluble in dichlorobenzene, dissolving in concentrated sulfuric acid with a brown-red coloration from which blue violet flakes separate on the addition of water, and dyeing cotton from a violet vat blue-violet fast shades.

In testimony whereof I have hereunto set my hand.

FRITZ ULLMANN.